(12) United States Patent
Edgar

(10) Patent No.: US 6,428,697 B1
(45) Date of Patent: Aug. 6, 2002

(54) SYSTEM FOR PROCESSING WASTE WATER

(76) Inventor: William W. Edgar, P.O. Box 10355, Brooksville, FL (US) 34603

(*) Notice: Subject to any disclaimer, the term of this patent is extended or adjusted under 35 U.S.C. 154(b) by 0 days.

(21) Appl. No.: 09/599,957

(22) Filed: Jun. 23, 2000

Related U.S. Application Data

(60) Provisional application No. 60/146,553, filed on Jul. 30, 1999.

(51) Int. Cl.[7] .............................. C02F 1/48; B01D 53/02
(52) U.S. Cl. .................... 210/195.1; 210/196; 210/197; 210/222; 210/223; 210/243; 210/252; 210/259; 210/263; 210/265; 210/287; 210/294; 210/295; 210/297; 210/359; 204/660; 204/664; 204/665; 96/108
(58) Field of Search .............................. 210/194, 195.1, 210/196, 197, 222, 223, 243, 252, 259, 263, 265, 287, 294, 295, 297, 359; 204/660, 664, 665; 205/500; 96/108

(56) References Cited

U.S. PATENT DOCUMENTS

| | | | |
|---|---|---|---|
| 4,201,140 A | * | 5/1980 | Robinson .................... 210/222 |
| 4,212,724 A | * | 7/1980 | Moeglich .................... 204/268 |
| 4,329,215 A | | 5/1982 | Scoville |
| 4,620,969 A | | 11/1986 | Wilkinson |
| 4,844,813 A | | 7/1989 | Helfgott et al. |
| 4,954,263 A | * | 9/1990 | Woodhouse ................. 210/695 |
| 5,211,852 A | | 5/1993 | Van de Walle et al. |
| 5,238,580 A | | 8/1993 | Singhvi |
| 5,336,398 A | | 8/1994 | Russell et al. |
| 5,540,835 A | * | 7/1996 | Sanderson ................... 210/222 |
| 5,597,479 A | * | 1/1997 | Johnson ...................... 210/223 |
| 5,601,040 A | | 2/1997 | McGill |
| 5,698,107 A | * | 12/1997 | Wuzberger et al. ......... 210/695 |
| 5,710,362 A | | 1/1998 | Vesiland et al. |
| 5,857,809 A | | 1/1999 | Longo, Sr. |
| 5,861,096 A | | 1/1999 | Mason et al. |
| 5,879,565 A | * | 3/1999 | Kusmierz et al. ........... 210/805 |
| 5,958,240 A | * | 9/1999 | Hoel .......................... 210/805 |
| 6,203,710 B1 | * | 3/2001 | Woodbridge ................ 210/223 |

* cited by examiner

Primary Examiner—David A. Reifsnyder
(74) Attorney, Agent, or Firm—Baker Botts L.L.P.

(57) ABSTRACT

Methods comprise processing wastewater to produce useful products. Preferably wastewater is ash leachate from landfills which is processed using magnetohydrodynamic treatment followed by electrolytic cell treatment to produce sodium hypochlorite. Methods further comprise removal of hazardous substances from wastewater for subsequent storage and processing of wastewater.

14 Claims, 5 Drawing Sheets

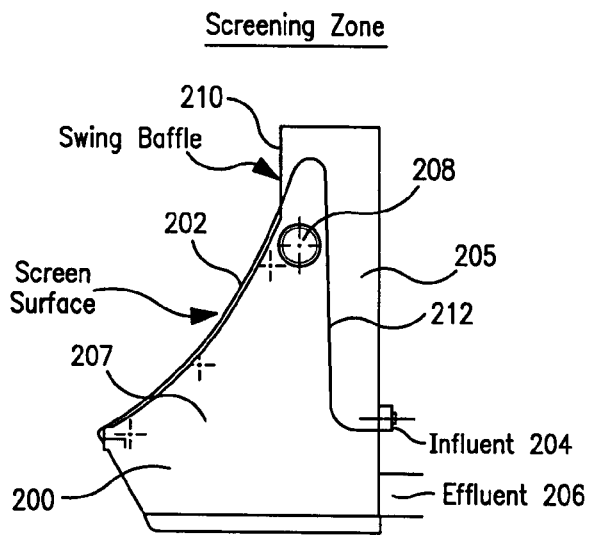
FIG. 2B
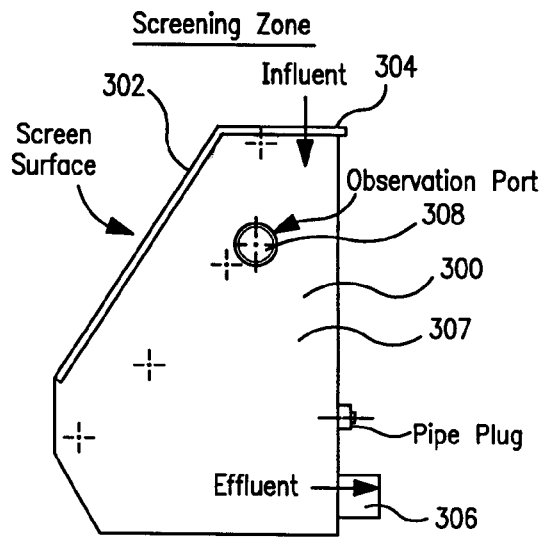
FIG. 2C
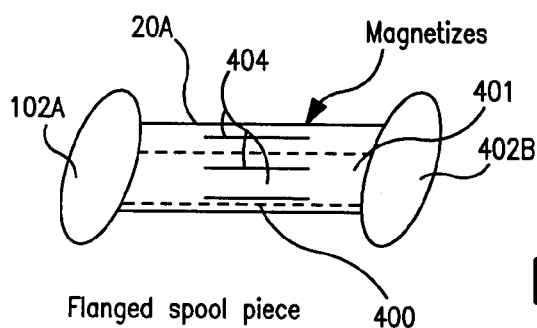
FIG. 3
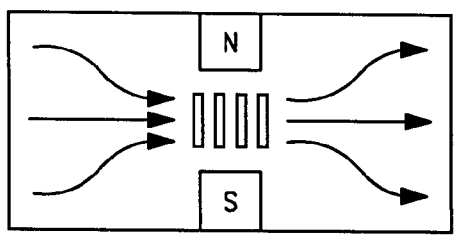
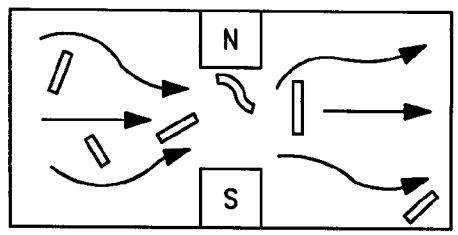

Electrolyzer Cut-a-way View of Flow

Front View

SYSTEM FOR PROCESSING WASTE WATER

REFERENCE TO RELATED APPLICATIONS

This application claims the benefit of United States Provisional Patent Application Ser. No. 60/146,553, filed Jul. 30, 1999, entitled "Methods For Processing Wastewater."

BACKGROUND OF THE INVENTION

1. Field of the Invention

The present invention is directed to methods of wastewater treatment and the by-products thereof, useful in a plurality of settings, such as, for example, municipal and industrial applications. More specifically, the invention relates to methods for treating leachate to produce useful by-products, such as sodium hypochlorite.

2. Description of the Background

Disposal of wastewater is a major problem facing industries and communities. There are numerous sources of wastewater, such as, for example, industrial pollution, industrial lagoons, human waste and landfills.

Landfills contain a wide variety of wastes which undergo decomposition. When rainfall penetrates landfill sites, the rainwater is mixed with the decomposing waste and produces wastewater known as leachate, which is laden with hazardous chemicals. Landfills are required to have landfill liners to prevent against leakage, as well as leachate collection and removal systems and leak detection systems. The liners are generally manufactured from plastic materials, clay substances or ash. Rainfall within these lined landfills or cells generates leachate which must be collected, treated, and disposed of to the satisfaction of environmental regulations.

Landfills generally have an on site leachate management facility (LMF) designed to manage, process and provide adequate capacity to treat the leachate. However, excessive rainfall amounts and/or operational problems can result in excess leachate being stored at the LMF facilities. Off site disposal of the leachate can assist in reducing the volume of on site leachate, but also generates additional problems because of the hazards and costs associated with transporting the toxic wastewater. Considering the volume of leachate generated at landfills and the excess leachate being stored on site, cost-efficient and safe alternate treatment and disposal methods are needed.

SUMMARY OF THE INVENTION

The present invention overcomes the problems and disadvantages associated with current strategies and designs and provides cost-effective and safe methods and systems for processing leachate and wastewater to produce useful products.

Accordingly, one embodiment of the invention is directed to a method for processing wastewater comprising the steps of exposing the wastewater to a first magnetic treatment and exposing the magnetized wastewater to an electrolytic treatment to produce at least one useful product, such as sodium hypochlorite. Preferably, the step of exposing the wastewater to the first magnetic treatment comprises passing the wastewater through a passageway or spool, the passageway having a plurality of magnets disposed circumferentially around the passageway. Exposing the wastewater to electrolytic treatment preferably comprises passing the wastewater through an electrolytic cell In a preferred embodiment, the method further comprises filtering the wastewater prior to exposing to the first magnetic treatment. Filtering may comprise passing the wastewater through a filter or a screening device or both. The filter may comprise a sand media base with an underdrain assembly. The screening device may comprise a static or rotating fine mesh screen.

The method may optionally further comprise exposing the magnetized wastewater to a second magnetic treatment. The method may optionally further comprise aerating the filtered wastewater. Aeration may be accomplished by passing the filtered wastewater through an air stripping tower. Preferably, the air stripping tower comprises: a mist distributor for distributing the wastewater; a packed bed disposed below the mist distributor, which contains packing material so that wastewater from the mist distributor flows downward over the packing material; and aerating means disposed below the packed bed for forcing air upwards over the packing material. Alternately, aerating may comprise passing the filtered wastewater through an aeration system, the aeration system comprising a tank for holding the wastewater and means disposed at the bottom of the tank for diffusing air upwards through the wastewater.

Optionally, the method may further comprise recycling the wastewater, by exposing the wastewater to a third magnetic treatment and a second electrolytic treatment. Alternately, recycling may further comprise subjecting the wastewater to a second aerating step before exposing the wastewater to the third magnetic treatment. If desired, the method may include a step of conditioning the wastewater by adding metal ions or salts to the wastewater.

Another embodiment of the invention is directed to a system for processing wastewater comprising a first magnetic treatment zone and an electrolytic treatment zone fluidly coupled to and disposed downstream from the magnetic treatment zone. The first magnetic treatment zone preferably comprises a cylindrical passageway or spool having a plurality of magnets disposed circumferentially around the passageway. Preferably, the system further comprises a filtration zone fluidly coupled to and disposed upstream from the first magnetic treatment zone. The filtration zone may comprise a filter or screening device or both, such as those described above.

Preferably, the system further comprises a second magnetic treatment zone similar to the first fluidly coupled to and disposed downstream from the first magnetic treatment zone, and an aerating zone fluidly coupled to and disposed downstream from the filtration zone. The aerating zone may comprise an air stripping tower or an aeration system, such as those described above.

Optionally, the system may comprise means for recycling the wastewater to the second magnetic treatment zone or, alternatively, further upstream to the aeration zone. If desired, the system may comprise means for bypassing one or more of the various zones, such as means for bypassing the filtration zone, the aerating zone, the first magnetic zone, the second magnetic zone or the electrolytic treatment zone.

Another embodiment is directed to an apparatus for removing a volatile hazardous substance, such as $H_2S$, from wastewater comprising: a mist distributor for distributing wastewater; a packed bed disposed below the mist distributor, the bed containing packing material, and wherein wastewater from the mist distributor flows downward over the packing material; and aerating means disposed below the packed bed for forcing air upwards over the packing material.

Another embodiment is directed to a method for removing volatile hazardous substances, such as $H_2S$, from wastewater comprising: distributing wastewater over a packed bed using a mist distributor, the packed bed disposed below the mist distributor and containing packing material; allowing the wastewater from the mist distributor to flow downward over the packing material; and aerating the wastewater by providing aerating means disposed below the packed bed to force air upwards over the packing material.

Other embodiments and advantages of the invention are set forth in part in the description which follows, and in part, will be obvious from this description, or may be learned from the practice of the invention.

DESCRIPTION OF THE DRAWINGS

FIG. 2B Side view of one embodiment of a screening portion of a screening/filtration treatment zone for use in the system of FIG. 1.

FIG. 2C Side view of another embodiment of a screening portion of a screening/filtration treatment zone for use in the system of FIG. 1.

FIG. 3 Side view of an MHD treatment zone for use in the system of FIG. 1.

DESCRIPTION OF THE INVENTION

Figure 1:
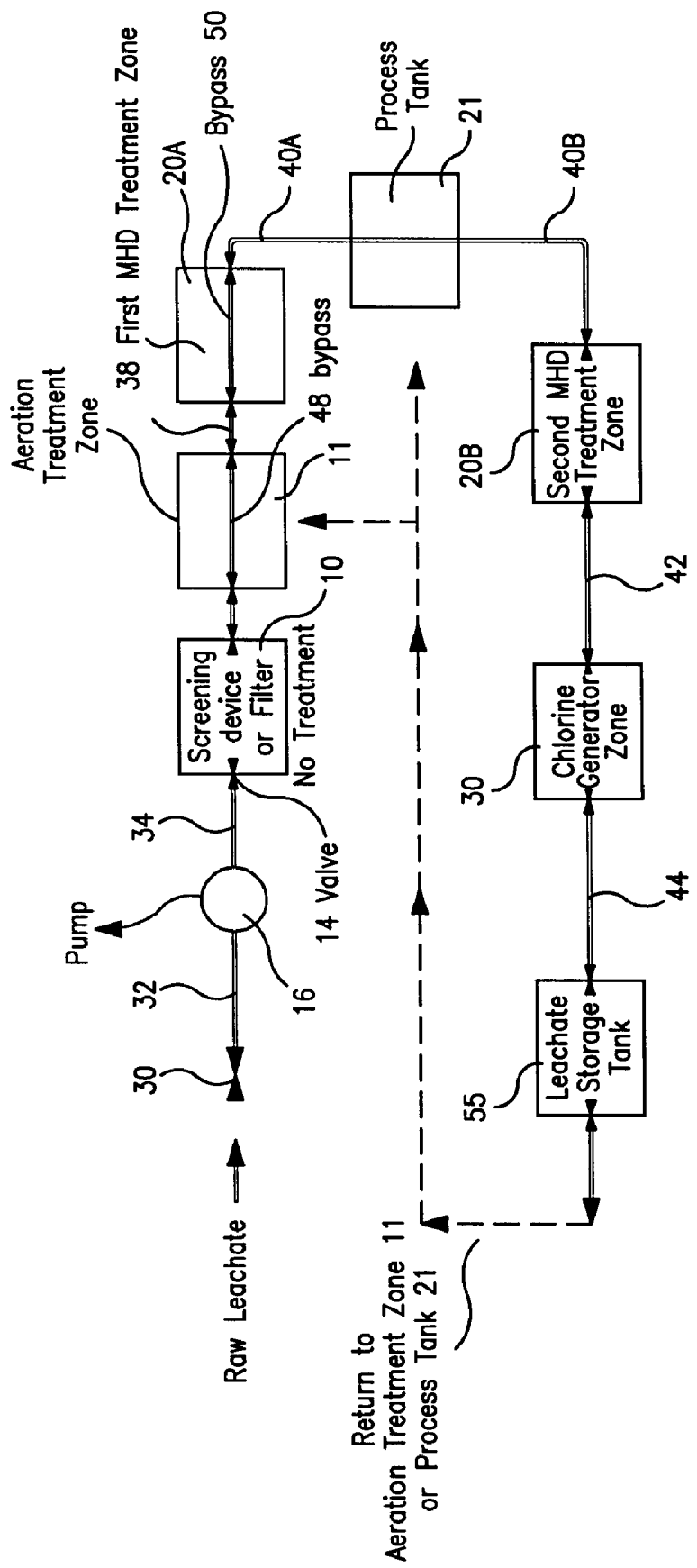
FIG. 1 Schematic of a leachate processing system according to one embodiment of the invention.

The present invention overcomes the problems and limitations associated with current methods and provides productive, safe and efficient methods and systems for processing wastewater. The present invention provides a system and method for processing leachate to produce useful by-products, such as sodium hypochlorite.

One embodiment of the present invention is directed to a method for processing hazardous wastewater into at least one useful product. In a preferred embodiment, the wastewater is ash leachate and the useful product is sodium hypochlorite. This method comprises the steps of subjecting the leachate to at least one magnetohydrodynamic (MHD) treatment step, followed by subjecting the leachate to a treatment step in an electrolytic cell. Optionally, the leachate may be subjected to a first screening and/or filtration step before the magnetohydrodynamic step.

In a preferred embodiment, the screening and/or filtration step consists of screening the leachate or effluent by passing it through a static or rotating fine mesh screen into a holding tank or area, followed by filtration. Filtration preferably comprises passing
the effluent through a sand media base with an underdrain assembly for a gravity flow-through the tankage.

The method may also optionally involve an aeration treatment step, after the step of subjecting the raw ash leachate to the step of screening and/or filtration for removal of solid matter. This aeration step assists in the oxidation of the leachate, and is preferably accomplished through the use of an air stripping tower (FIG. 5) or an aeration system (FIG. 6). Should extended aeration be required, an aeration system with diffused air (FIG. 6) is used to provide longer term aeration, as discussed below.

After screening/filtration and, optionally, aeration, the leachate undergoes an MHD treatment step followed by the electrolytic treatment step. Optionally, the leachate may then be re-circulated to allow the MHD and electrolytic treatments to be repeated. If desired, the leachate may be recirculated farther upstream, to allow for the aeration step to be repeated, as well as the MHD and electrolytic treatments.

The method may also optionally involve subjecting the leachate to one or more of the following steps to remove calcium: a second MHD treatment step, an additional aeration step, or a chemical conditioning step. Should the leachate contain high levels of calcium, an in-place chemical cleaning (acid wash) cycle or a reverse polarity cycle may be used for removal of accumulation on the cell plates of the electrolytic cell.

The method may optionally comprise a pre-treatment step directed to conditioning the leachate. Conditioning may comprise the addition of substances such as, for example, metal ions or salts, or charging the leachate with electric current. Conditioning may also comprise the removal of substances from the leachate, such as, for example, removal of solid matter by screening/filtration, or removal of hydrogen sulfide by aeration.

Sodium chloride or ordinary salts may be used to condition the raw leachate to generate sodium hypochlorite. The inclusion of the salt residue may increase the chloride content of the leachate and allow for a more concentrated sodium hypochlorite to result from the treatment method. Chloride is the essential ion in the electrolyte solution for the production of sodium hypochlorite. The additional chloride is added as required to the leachate tank and introduced at a rate to be used in the system. This concentrated leachate solution flows through the electrolyte cell.

FIG. 1 is a schematic of a leachate processing system 1 according to a preferred embodiment of the invention. Processing system 1 comprises a screening/filtration zone 10, which contains a screening device or filter (or both), an aeration treatment zone 11, a first MHD treatment zone 20A, a second MHD treatment zone 20B, a chlorine generator/electrolytic treatment zone 30 and an effluent storage tank 55. The system is designed so that screening/filtration zone 10, aeration treatment zone 11, first MHD treatment zone 20A, or second MHD treatment zone 20B can each be bypassed if desired. A holding or process tank 21 may be disposed downstream of zone 20A.

Raw leachate entering through valve 30 and pipe 32 is pumped via pump 16 through pipe 34 and valve 14 into screening/filtration zone 10. After filtration in zone 10, the effluent is sent via pipe 36 to aeration treatment zone 11. From zone 11, effluent flows through pipe 38 into first MHD treatment zone 20A.

Optionally, the leachate may bypass the aeration treatment zone 11 through bypass 48, and flow directly from the screening/filtration zone 10 through pipe 38 into first MHD treatment zone 20A. After treatment in zone 20A, the effluent is sent via pipe 40A to process tank 21, or alternately, the effluent may bypass first MHD treatment zone 20A through bypass 50 and be sent directly from zone 10 through pipe 38, bypass 50 and pipe 40A to process tank 21. From process tank 21, effluent flows through pipe 40B to second MHD treatment zone 20B. After one or more MHD treatments, the effluent flows through pipe 42 into electrolytic treatment/chlorine generator zone 30. After processing in electrolytic treatment zone 30, the effluent is sent through pipe 44 to effluent storage or holding tank 55. From effluent storage tank 55, the effluent is sold, disposed of or may be recycled back through the system (i.e., back to aeration zone 11 or process tank 21) as described below.

In operation, effluent is pumped to screening/filtration zone 10 for stage 1 treatment. Zone 10 preferably has a screen or filtering portion or device to remove solids or non-degradable materials. As noted, screening may be accomplished by passing the effluent through a static or rotating fine mesh screen followed by filtering through a sand media base with an underdrain assembly for a gravity flow-through the tankage. Optionally, the screening/filtration zone may be taken off line to allow bypass of the screening step.

In one embodiment, the raw ash leachate is collected through series of piping systems surrounding the lined landfill cell. The leachate flows through manholes into a lift station, pumping the raw leachate into screening/filtration zone 10. The screening zone removes any solid matter and/or nondegradable material. This removed material (screenings) may be returned to an incinerator for further treatment. After the raw leachate has been screened, the leachate flows into a filter device for additional separation of solids, if needed.

Figure 2A:
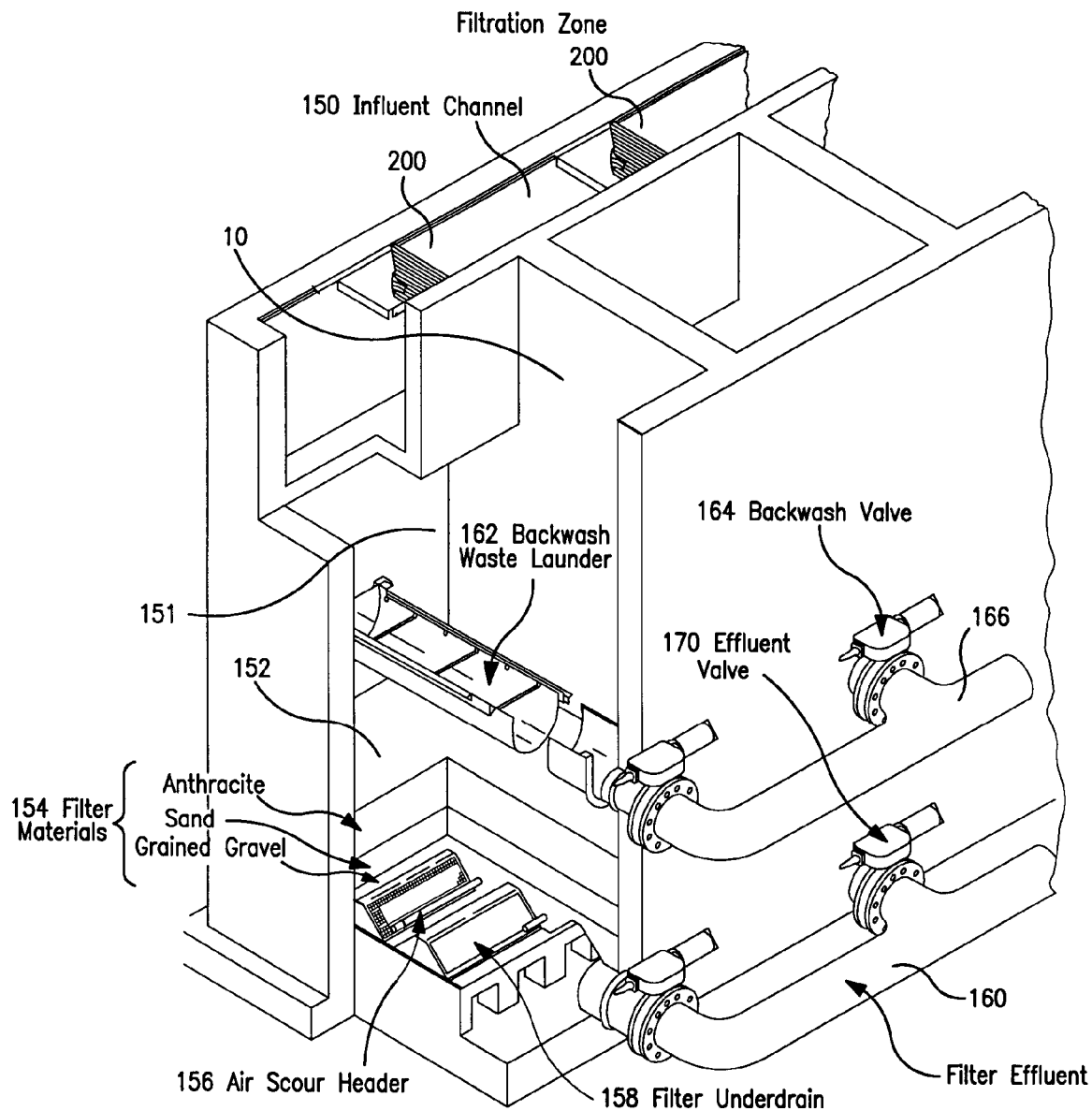
FIG. 2A Perspective cut away view of a screening/filtration treatment zone for use in the system of FIG. 1.

FIG. 2A depicts a preferred embodiment of screening/filtration zone 10 for use in system 1. Screening/filtration zone 10 preferably comprises an influent channel 150, one or more screening portions 200 or 300, as described below, holding tank or area 151, filtration zone 152, containing filtration media 154, air scour header 156, filter underdrain assembly 158, and effluent channel 160, controlled by effluent valve 170. The filtration zone 152 is preferably disposed at the bottom of tank 151 to allow gravity flow through. The filtration media 154 preferably comprises sequential layers of anthracite (top), sand (center) and graded gravel (bottom). A backwash waste launder 162 and backwash channel 166, controlled by backwash valve 164 may be provided to provide backwash into tank 151.

Leachate flows from influent channel 150 through screening portions 200 or 300 into tank 151. Backwash waste launder 162, disposed in tank 151, provides backwash as desired. Leachate in tank 151 then flows through the filtration media 154 of filtration zone 152, and passes by air scour header 156. Leachate exits the screening/filtration zone through effluent channel 160.

Preferred embodiments of two separating devices for use in screening/filtration zone 10 are depicted in FIGS. 2B and 2C.

Referring to FIG. 2B, screening portion 200 comprises curved screen 202, influent port 204, influent region 205, effluent port 206, effluent region 207, observation port 208, and swing baffle 210. Dividing wall 212 and screen 202 separates influent region 205 from effluent region 207. Leachate entering influent port 204 flows through influent region 205 and passes through screen 202. From screen 202, the effluent flows through effluent region 207 and exits through effluent port 206. Screen 202 is preferably a fine mesh screen.

Another screening portion useful in zone 10 is depicted in FIG. 2C.

Referring to FIG. 2C, screening portion 300 comprises screen 302, influent zone 304, effluent port 306, effluent region 307, and observation port 308. Screen 302 covers influent zone 304. Leachate entering influent zone 304 is filtered as it flows through screen 302 into effluent region 307. The filtered leachate exits zone 300 through effluent port 306. Screen 302 is preferably a fine mesh screen.

After screening/filtration, the leachate flows through the aeration contact or treatment zone 11 which oxidizes the leachate. The aeration treatment zone 11 preferably comprises an air stripping tower 600 (FIG. 5) or, alternately, aeration system 650 (FIG. 6). Optionally, the aeration step may be bypassed.

Figure 5:
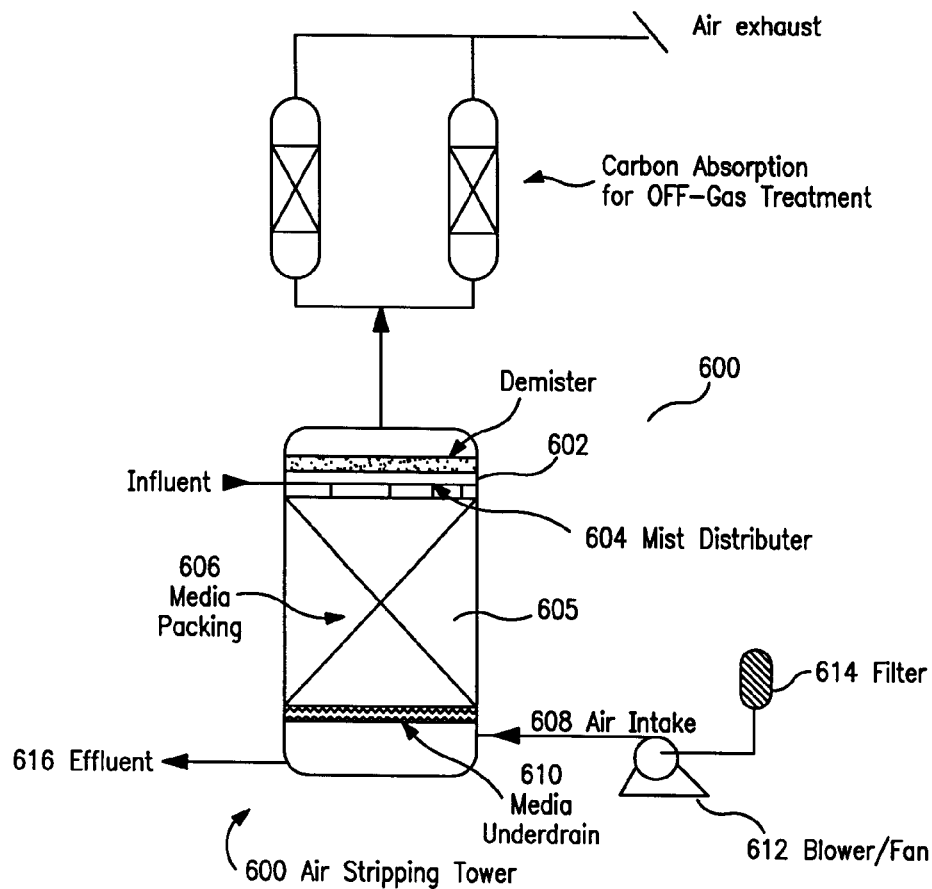
FIG. 5 Schematic of an air stripping tower.
Figure 6:
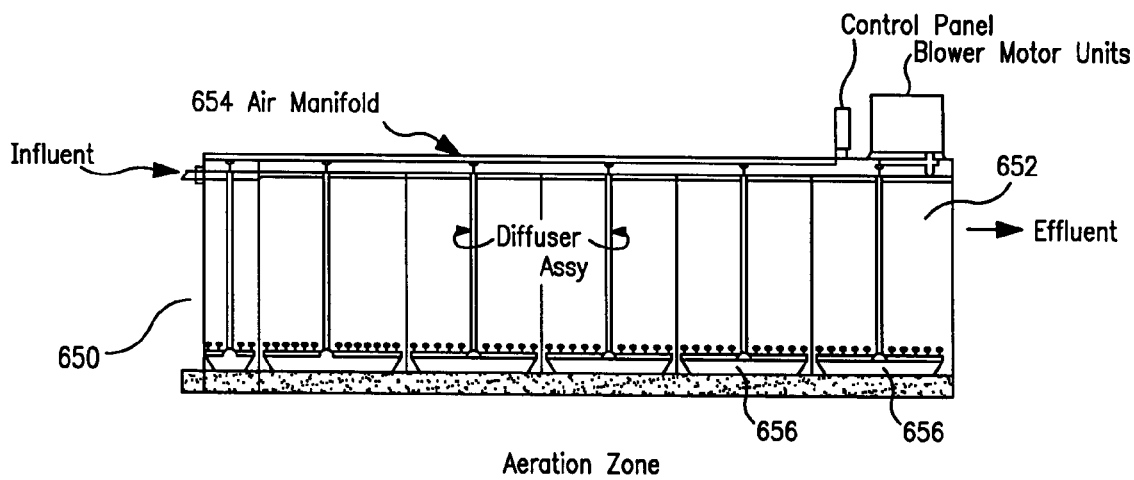
FIG. 6 Schematic of an aeration system.

A preferred embodiment of an air stripping tower is depicted in FIG. 5.

Referring to FIG. 5, air stripping tower 600 comprises influent passageway 602, mist distributor 604, packed bed 605 containing packing 606, air intake 608, media underdrain 610, blower/fan 612, filter 614 and effluent passage 616.

In operation, leachate is pumped into tower 600 through influent passage 602 to the top of packed bed 605. The packing media 606 is preferably a randomly dumped plastic media that provides a very large effective surface area per unit volume for mass transfer.

The leachate is carefully distributed at the top of tower 600 by means of mist distributor 604. Leachate flows down the packed bed 605 in opposite direction to ascending air provided by blower/fan 612 through air intake 608. Filtered air (filtered by filter 614) is introduced into the stripper 600 by means of blower/fan 612. The blower/fan 612 forces an air draft across the filter media packing 606. The air strips the volatile organic compounds (VOC) out and exits the top of the stripper. Packing 606 provides the necessary surface and turbulence to allow the air to strip the organics effectively down to very low levels. The packing is supported at the bottom of the bed by an underdrain assembly 610.

Should longer aeration be required, aeration system 650 with diffused air is preferably used to provide the additional aeration time requirements. A preferred embodiment of aeration system 650 is depicted in FIG. 6. Aeration system 650 is preferably comprised of a holding tank 652, blower assembly 654, and bubble diffusers 656 for discharging air into the bottom levels of the aeration tank. Depending on site specifics, the leachate may remain in the aeration system 650 one to twelve hours.

After aeration in system 650 or tower 600, the leachate undergoes stage 2 treatment, comprising subjecting the effluent to a first and optionally a second MHD treatment in MHD zones 20A and 20B. If only one MHD treatment is desired, the leachate may bypass zone 20A and go to zone 20B for MHD treatment. If two MHD treatments are desired, the leachate flows into zone 20A for a first treatment and then flows through tank 21 and is sent to zone 20B for a second MHD treatment.

FIG. 3 depicts a preferred embodiment of MHD zone 20A or 20B. Referring to FIG. 3, MHD treatment zone 20A (or 20B) preferably comprises a spool 400 having a passageway 401 therethrough, and two flanges 402A and 402B at its opposite ends. A plurality of magnets 404 are disposed circumferentially around spool 400. Leachate passing through passageway 401 is subjected to magnetohydrodynamic treatment from magnets 404. The movement of the leachate through the magnetic field at right angles to flow produces a crystal altering charge. Turbidity particles gain piezoelectric-induced surface charge to transform downstream scale deposits. Specifically, paramagnetic and diamagnetic turbidity particles enter the orthogonal magnetic field, rotate, and pickup stress-induced piezoelectric charge. This charge is transferred to downstream scale, which softens and is eroded away by fluid flow.

The MHD zone or unit is a self-contained water treatment device that alters the scaling characteristics of aqueous fluids by causing minerals which are dissolved or suspended in the fluids to interact with intense magnetic fields. The function of the MHD zone is to prevent scale from being deposited in pipes and/or the electrolyte cells and to facilitate the removal of existing scale deposits. The mineral salts which normally produce scale in aqueous systems undergo complex chemical and physical changes within and downstream of the MHD zone as a result of interaction with an intense magnetic field. It is a well known law of physics that when a conductor of electricity moves through a magnetic field, an electromotive force is produced. In electrical generators this force causes electrical current flow. In aqueous solutions, this force causes dissolved or suspended minerals to undergo changes in surface charge, particle size, crystalline morphology, and solubility which alters their ability to produce scale. The net result is generation of a fluid which contains particles that are not only reluctant to precipitate as scale, but which can also attach and dissolve existing scale downstream of the treatment unit.

After the one or two MHD treatments are completed, the leachate flows into electrolytic cell in electrolytic treatment zone 30 for stage 3 treatment. Stage 3 treatment preferably comprises passing the leachate through the electrolytic cell or electrolyzer disposed in electrolytic treatment zone 30, for the generation of a useful product.

Figure 4A:
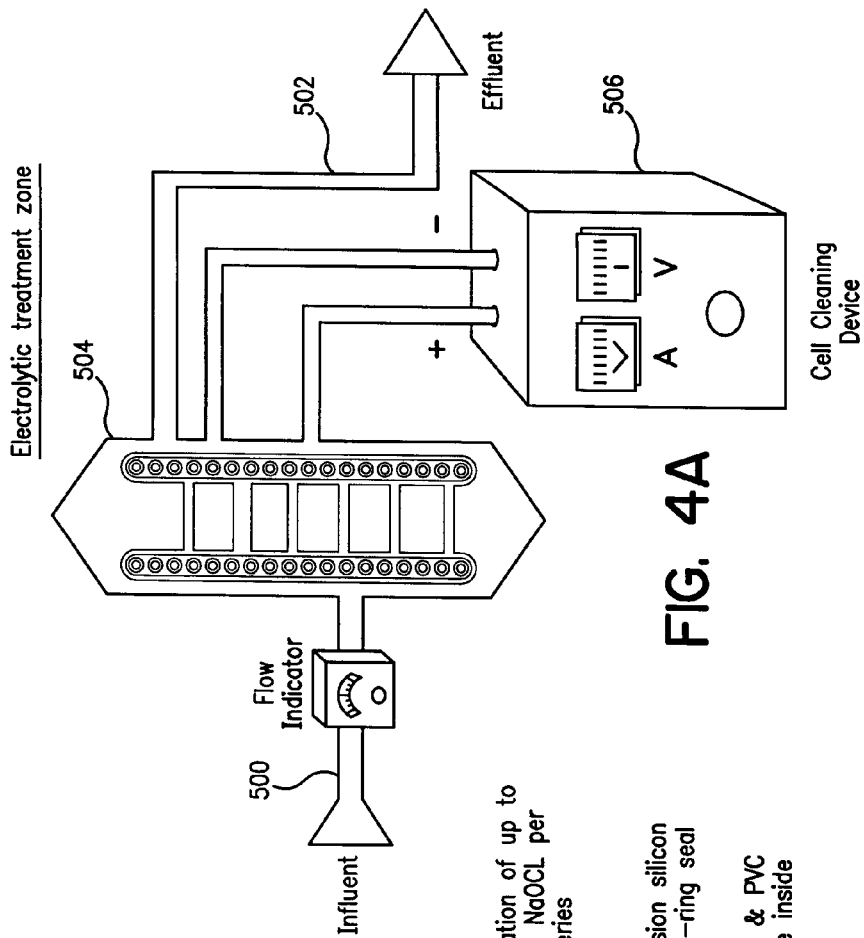
FIG. 4A Schematic of an electrolytic treatment zone for use in the system of FIG. 1.

A preferred embodiment of electrolytic treatment zone 30 is depicted in FIG. 4A. Electrolytic treatment zone 30 comprises an influent port 500, an electrolyzer 504, an effluent port 502, and a cell-cleaning device 506. Effluent flows into electrolytic treatment zone 30 through influent port 500, passes through electrolyzer 504 and exits through effluent port 502.

Figure 4B:
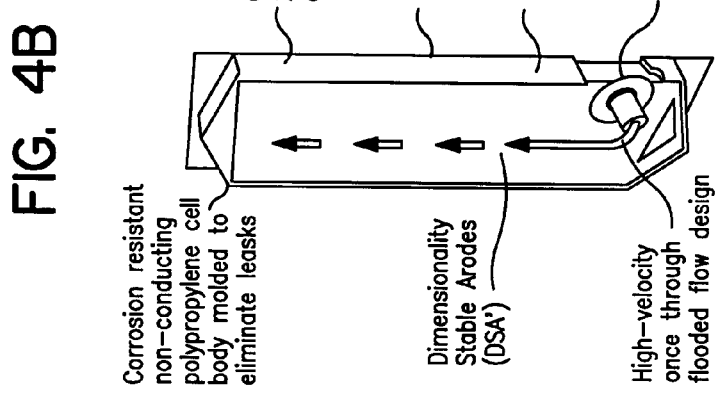
FIG. 4B Cut away view showing flow through an electrolyzer.
Figure 4C:
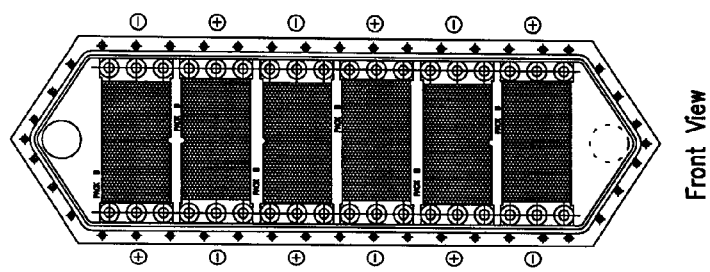
FIG. 4C Front view of an electrolyzer.

Electrolyzer 504 is depicted in cutaway view in FIG. 4B and a front view is depicted in FIG. 4C. Preferably, the electrolyzer comprises a corrosion-resistant, nonconducting polypropylene cell body, molded to eliminate leaks, and has a concentration of up to 230 ppm NaOCl per cell in series. A compression silicon rubber O-ring seal may be provided, and titanium and PVC hardware may be used inside the cell. Dimensionally Stable Anodes, and a high-velocity, one through flooded flow design are preferred.

In a preferred embodiment, oxide coated anodes are used in the electrolytic cell. These anodes have been developed for the production of sodium hypochlorite (NaOCl) by the electrolysis of seawater or brine. The coatings have a long life under various conditions and have proven reliable for sodium hypochlorite production.

If desired, the excessive coating of the electrolytic cell plate may be cleaned by utilizing cell-cleaning device 506, which preferably comprises a low voltage DC power supply with a current limiting resistor to perform reverse polarity for cleaning. This approach minimizes cleaning downtime and the need for in-place cleaning chemicals.

The foregoing system may be used to produce sodium hypochlorite (NaOCl), in which case electrolytic treatment zone 30 is referred to as a chlorine generator. The connections, including pipes 32, 34, 36, 38, 40A, 40B, 42 and 44 shown in FIG. 1 may be any standard connectors such as, for example, PVC piping and valves.

The flow rates through system 1 may vary, according to site conditions and requirements. From stage 3 treatment, the leachate is sent through pipes 44 to effluent storage or holding tank 55.

In a preferred embodiment, the treated leachate comprising sodium hypochlorite is returned to the top of process tank 21 and re-sent through the treatment process. Alternately, it may be recycled to aeration zone 11. Subsequent treatments help to increase the sodium hypochlorite concentration of the end product.

As will be clear to those of skill in the art, the methods of the present invention may be performed on site, for example, at a municipal or industrial landfill. On site processing may comprise pumping wastewater from a collection area into a processing unit. In a preferred embodiment, the wastewater is leachate collected from a landfill and processed on site. On site processing may comprise a processing unit attached to a vehicle, such as, for example, a truck. Alternatively, the method may be performed at an off site facility. Off site processing comprises transporting a volume of wastewater to a processing facility.

Possible uses for the sodium hypochlorite solution generated by the present invention include, but are not limited to, an oxidizing agent in a hydrogen sulfide stripping tower, a disinfectant for wastewater treatment plants, and blending with other effluents prior to disposal in a municipal or industrial water reuse system.

The water quality parameters resulting from treating leachate by the present invention do not appear to prohibit disposal, when blended with other effluents, of the sodium hypochlorite generated by the methods herein.

Another embodiment of the present invention is directed to a method of removing at least one hazardous substance from wastewater. In a preferred embodiment, the hazardous substance is hydrogen sulfide ($H_2S$) and the wastewater is leachate. The removal of the hazardous substance may be coupled to a processing method, such as the one described above, in which at least one useful substance is produced from the wastewater. For example, in a preferred embodiment, hydrogen sulfide is removed from landfill leachate prior to processing the leachate to produce liquid sodium hypochlorite.

Removal of $H_2S$ from the raw leachate may comprise sending the leachate through a vertical tower containing plastic air stripping media, such as tower 600, shown in FIG. 5. Volatile compounds have a natural tendency to leave the water and evaporate into air or other gases that are free of the contaminant. This high volatility makes these organic compounds easy to remove from water by putting the contaminated water in contact with air that is free of the pollutant. This process is called air stripping since the VOC is "stripped" out of the water with air. In essence, the VOC is removed from the water and transferred to the air. In the air stripping tower, the contaminated water is introduced to the top of a packed bed. The leachate is carefully distributed at the top of the tower by means of a liquid mist distributor 604, coming in contact with the filter media (packing) 606. The packing 606 is preferably a plastic media that is intended to provide a very large effective surface area per unit volume of mass transfer. Water flows down the packed bed 605 in opposite direction to ascending air. The packing 606 is supported at the bottom of the bed by a media support underdrain assembly 610 designed not to constrain the gas or air flow. Filtered air is introduced into the stripper by means of a blower or fan 612. This air strips the VOC out and exits the top of the stripper. The treated leachate leaves the bottom of the packed section and flows into a sump. As noted, the stripping tower 600 may be incorporated into the recycling system 1 for the hypochlorite generation system.

Other embodiments and uses of the invention will be apparent to those skilled in the art from consideration of the specification and practice of the invention disclosed herein.

U.S. Pat. No. 5,857,807, U.S. Pat. No. 5,861,096, U.S. Pat. No. 4,329,215, U.S. Pat. No. 4,620,969, U.S. Pat. No. 5,601,040, U.S. Pat. No. 5,238,580 and U.S. Pat. No. 5,211,852 are specifically and entirely incorporated by reference. All other references cited herein, including all foreign patents and patent applications are specifically and entirely hereby incorporated herein by reference, including, but not limited to, United States Provisional Patent Application Ser. No. 60/146,553, filed Jul. 30, 1999, entitled "Methods For Processing Wastewater." The specification and examples should be considered exemplary only within the true scope and spirit of the invention.

I claim:

1. A system for processing wastewater comprising:
   an aerating zone comprising a stripping tower;
   a first magnetic treatment zone fluidly coupled to and disposed downstream from the aerating zone;
   a second magnetic treatment zone fluidly coupled to and disposed downstream from the first magnetic treatment zone; and
   an electrolytic treatment zone fluidly coupled to and disposed downstream from the second magnetic treatment zone, wherein said stripping tower comprises:
   a mist distributor for distributing wastewater;
   a packed bed disposed below the mist distributor, wherein the bed contains packing material and the wastewater from the mist distributor flows downward over the packing material; and
   means for aerating disposed below the packed bed for forcing air upwards over the packing material.

2. The system of claim 1 wherein the first magnetic treatment zone comprises a cylindrical passageway having a plurality of magnets disposed circumferentially around the passageway.

3. The system of claim 1 further comprising a filtration zone fluidly coupled to and disposed upstream from said first magnetic treatment zone.

4. The system of claim 3 wherein said filtration zone comprises a filter, a screening device or both.

5. The system of claim 4 wherein the filter comprises a sand media base with an underdrain assembly.

6. The system of claim 4 wherein the screening device comprises a static or rotating fine mesh screen.

7. The system of claim 3 further comprising means for bypassing said filtration zone.

8. The system of claim 1 further comprising means for recycling wastewater to said second magnetic treatment zone.

9. The system of claim 1 further comprising means for recycling wastewater to said aeration zone.

10. The system of claim 1 further comprising means for bypassing said aeration zone.

11. The system of claim 1 further comprising means for bypassing said first magnetic zone.

12. The system of claim 1 further comprising means for bypassing said second magnetic zone.

13. The system of claim 1 further comprising means for bypassing said electrolytic treatment zone.

14. The system of claim 1 wherein the system produces sodium hypochlorite.

* * * * *